Oct. 16, 1934.  H. F. HEBLEY ET AL  1,977,479
DUST EXTRACTION APPARATUS
Filed March 1, 1933
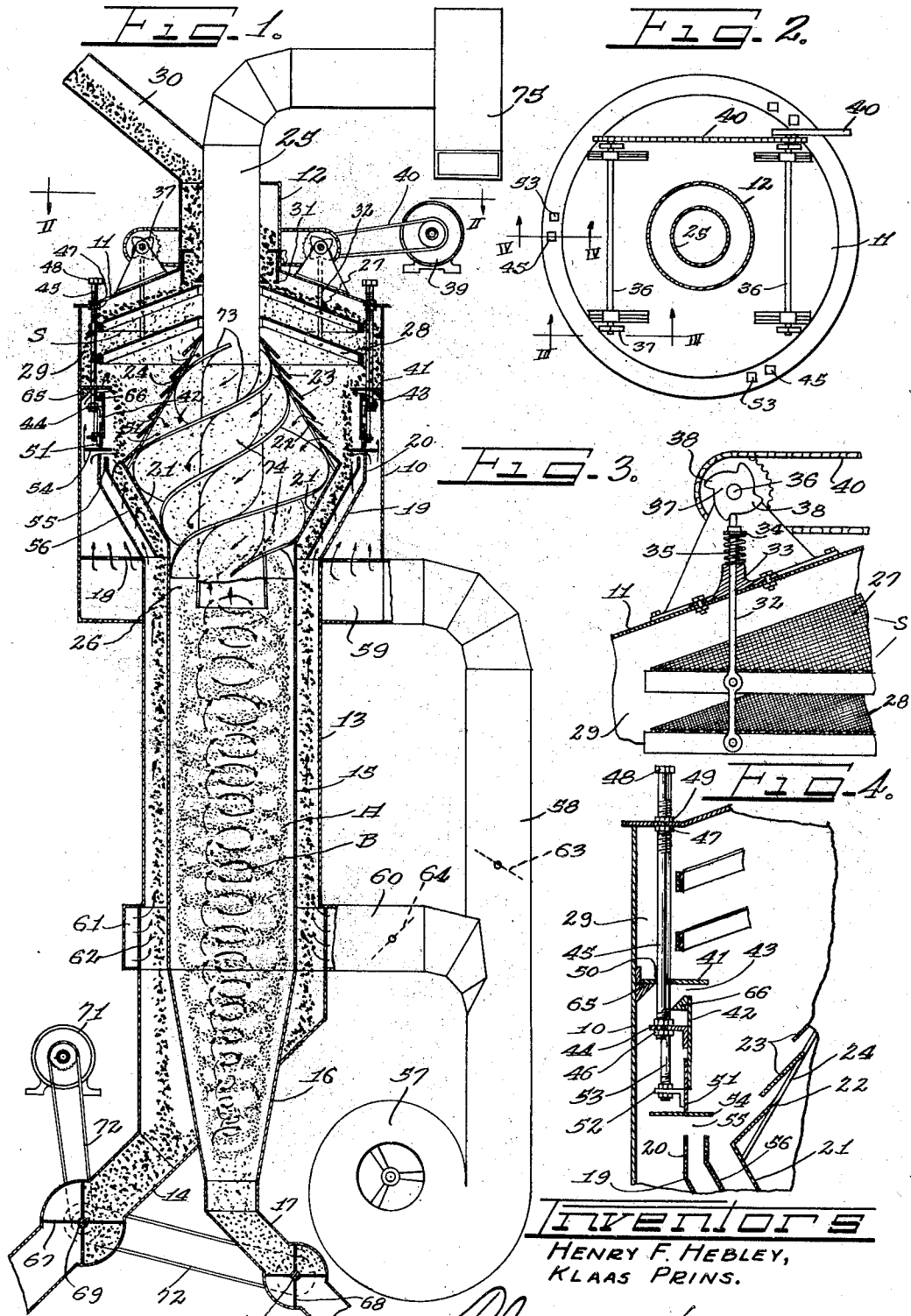
Inventors
HENRY F. HEBLEY,
KLAAS PRINS.

Patented Oct. 16, 1934

1,977,479

UNITED STATES PATENT OFFICE 1,977,479

DUST EXTRACTION APPARATUS

Henry F. Hebley and Klaas Prins, Chicago, Ill.

Application March 1, 1933, Serial No. 659,104

13 Claims. (Cl. 209—36)

This invention relates to dedusting or dust extraction apparatus which is particularly useful for removing the dust from raw coal, the invention relating particularly to that type of apparatus in which raw coal falls in showers or sheets with air streams directed therethrough for carrying away the coal dust and very fine particles and with further provision for extracting the dust out of the air so that it may be collected.

An important object of the invention is to provide for subjecting the raw coal to a preliminary screening treatment during which most of the dust falls through the screen and the coal is directed to flow downwardly in shallow streams or sheets through which air is blown for the eventual removal of all of the dust from the coal.

A further object is to provide improved means for receiving the dust blown thereinto by the air streams and for defining a vortex flow of the air and collected dust by the action of which vortex the dust is separated from the air to be collected while the exhaust air escapes free from dust.

Another object is to provide improved means for adjusting the air flow for the most efficient separation of the dust from the coal.

The above enumerated and other features of the invention are incorporated in the structure disclosed on the drawing, in which drawing Figure 1 is a vertical diametral section of the structure;

Figure 2 is a section on plane 2—2 Figure 1;

Figure 3 is an enlarged section on plane 3—3 Figure 2;

Figure 4 is an enlarged section on plane 4—4 Figure 2.

The structure comprises the upper part or head 10 in the form of a cylindrical shell of sheet metal having the top 11 convex outwardly and terminating in the cylindrical neck 12. Extending downwardly from the head 10 concentric therewith but of less diameter is the outer cylindrical shell or duct 13 which contracts at its lower end to substantially frusto-conical shape and leads to the outlet or discharge duct 14. Within the outer shell 13, concentric therewith but of less diameter, is the inner shell 15 whose lower contracted or frusto-conical end 16 projects through the lower wall of the shell 13 and leads to a discharge duct 17.

Within and above the bottom wall 18 of the head 10 the upper end of the outer shell 13 has the flaring or frusto-conical section 19 terminating in the cylindrical end 20. The upper end 21 of the inner shell 15 extends within the head 10 and is flared to frusto-conical shape to be parallel but spaced inwardly of the flared end 19 of the outer shell 13. Mounted at its base on the upper edge of the flared end 21 is the frusto-conical louver frame or wall 22 having the overlapping louvers 23 separated by air ports or passageways 24, the louvers inclining downwardly. The open upper end of the louver frame or wall surrounds and receives a cylindrical outlet duct 25 which extends upwardly through the neck 12 of the head 10 and downwardly to terminate a distance below the upper end of the inner shell 15, the diameter of this duct 25 being less than the diameter of the shell 15 to leave the annular passage 26 for connecting the shell 15 with the space enclosed by the flared wall 21 and the louver wall.

Between the top wall of the head 10 and the upper end of the louver wall 22 screen structure S is interposed, the structure shown comprising an upper screen 27 and a lower screen 28, the upper screen being preferably coarser than the lower screen. The screens are annular and receive and engage at their center the duct 25 but terminate at their ends a distance away from the cylindrical wall of the head 10 to leave an annular passageway 29. The screens are parallel and deflect downwardly, presenting frusto-conical upper surfaces. A chute 30 serves to conduct through the neck 12 of the head 10 the raw coal which is to be dedusted, the coal flowing down the annular space between the neck wall and the duct 25 and onto the upper coarser screen 27, the dust and coal pieces which do not fall through the screen apertures falling downwardly through the annular passage 29. The material passing through the upper screen is received by the lower screen 28 which is finer to allow only coal dust and very small coal particles to fall through, the other material flowing down the screen and into the passageway 29.

Suitable means may be provided for controlling the flow of the raw coal onto the screens. As shown an annular gate 31 is slidably adjustable in the neck 12 for determining the size of the outlet gap between its lower edge and the top of the upper screen.

Provision is made for vertically vibrating the screen structure. As shown the screens are secured to vertical rods 32 slidable through guide lugs or fittings 33 on the top 11 of the head 10, the rods near their upper ends having abutment collars 34 between which and the fittings 33 springs 35 surround the rods for resisting downward displacement thereof. Secured on shafts 36 above the rods are cams 37 engaging the upper ends of the rods so that when the shafts are turned the cam arms 38 will depress the rods, the cam arms and springs cooperating to cause vertical vibration of the screen structure S. The shafts 36 may be rotated by a suitable motor 39 through suitable connections 40. Upon vibration of the screens the material thereon will be agitated so that the larger particles on the screens will flow downwardly to the passageway 29 and the finer material will pass through the screen apertures to drop directly downwardly.

Below the outer edge of the lower screen an annular ledge or guide wall 41 extends inwardly from the cylindrical wall of the head 10. Below the ledge 41 is a cylindrical shell or ring 42 of sheet metal whose diameter is greater than the inner diameter of the ledge 41 so that the ledge will overhang the ring, and the ring is below the ledge to leave an annular air port or nozzle passageway 43. The nozzle defining ring 42 is supported to be vertically adjustable for adjustment of the nozzle passageway. As shown, the ring has brackets 44 secured to the outside thereof to receive the lower ends of rods 45 which extend upwardly through the top 11 of the head 10. The brackets 44 may be received between collars 46 on the rods so that the rods may be rotated and at their upper ends the rods are threaded for engagement with nuts 47 secured to the top 11. The rods terminate at their upper ends in polygonal heads 48 so that they may be readily turned by a wrench or other tool for vertical adjustment of the ring 42, and lock nuts 49 may be provided for securing the rods after adjustment has been made. The rods extend through openings 50 in the ledge 41.

Telescoping the ring 42 is a lower ring 51 of sheet metal having supporting brackets 52 for receiving rods 53 which at their upper ends are supported in the same manner as the rods 45 for vertical adjustment of the ring 51, the rods 53 and 45 being staggered so as not to interfere with each other. At its lower end the ring 51 supports a radially extending annular flange or plate 54 which is a distance above the upper edge of the cylindrical wall 20 to leave the annular air port or nozzle 55, the width of this nozzle or port being determined by the adjustment of the ring 51. Between the upper flared ends 19 and 21 of the outer and inner shells 13 and 15 is interposed a screen 56 whose body is parallel with the walls 19 and 21 and whose upper end is cylindrical and terminates adjacent to the upper edge of the cylindrical wall 20 and outwardly of the inner edge of the wall or plate 54.

A suitable blower 57 blows air under pressure into a duct 58 which at its upper end communicates with the annular air chamber 59 surrounding the outer shell 13 below the bottom wall 18 of the head 10, this bottom wall being perforated for the upward flow of the air between the cylindrical wall of the head 10 and the upper end 19 of the outer shell 13. A branch pipe 60 from the blower duct 58 leads to the air drum 61 surrounding the outer shell 13 near the bottom thereof, the shell wall having the openings or perforations 62 therethrough for the flow of the air into the space between the outer and inner shells 13 and 15. A regulating damper 63 is provided in the duct leading to the head 10 and a damper 64 is provided in the branch duct 60.

The air discharged into the head 10 around the upper end 19 of the outer shell is distributed into the space between the head cylindrical wall and the rings 42 and 51 and is blown inwardly through the ports or nozzle passageways 43 and 55, the plates 41 and 54 directing this air to flow radially toward the louver wall 22 and through the spaces 24 between the louvers and to the interior of the louver frame where the air tends to enter the bottom of the discharge or exhaust duct 25 and flow upwardly through the duct. The greater part of the air blowing upwardly between the shells 13 and 15 will flow between the screen 56 and the walls 19 and 20 to be directed by the plate 54 toward the louver openings.

The raw coal to be dedusted flows along the screens 27 and 28, the dust and finer particles dropping directly through the screens and the larger particles flowing down through the annular passageway 29 to be deflected by the ledge 41 to continue downwardly below the ledge and without escaping through the air inlet passageway 43. The coal continues downwardly and is deflected radially inwardly by the plate 54 at the bottom of the ring 51 to be prevented by the plate from escaping through the air inlet passageway 55 and to fall onto the screen 56. The air blown through the annular passageway 43 encounters the dust falling through the screens 27 and 28 and carries this dust to the interior of the louver frame where the collected dust will tend to settle downwardly in the inner shell 15. As the coal travels past the plate 54 it will be met by the air blown through the passageway 55, this air carrying with it any dust or smaller particles which may still remain in the coal and conveying it through the louver openings into the louver frame. As the coal travels downwardly between the outer and inner shells 13 and 15 the air flowing upwardly through this space from the branch duct 60 will take with it any remaining particles of dust to be carried thereby into the louver frame and any dust which is filtered through the screen 56 will be taken up by this air stream. To more accurately guide the air through the passageway 43 and to prevent eddy currents, an annular filler 65 of triangular cross-section may be inserted in the corner between the ledge 41 and the wall of the head 10, and a collar 66 of substantially triangular cross-section may surround the upper end of the ring 42 and this collar and the filler ring may be of material such as wood, the collar 66 serving also to stiffen and strengthen the ring 42.

The outlet ducts 14 and 17 of the outer and inner shells 13 and 15 respectively are kept closed so as to prevent disturbance of the air circulation through the structure. We have shown rotary gates 67 and 68 in the discharge ducts which gates keep the ducts closed but when driven will cause discharge of the collected coal and dust. The gates are mounted on shafts 69 and 70 respectively to be rotated at the proper rate by a suitable motor 71 through belting 72 or other transmission mechanism.

Improved means are provided for creating a cyclonic action within the inner shell 15 so as to subject the air and the dust collected thereby to a whirling action for separation by centrifugal force of the dust particles from the air. Within the air and dust receiving space, defined by the lower end of the duct 25 and the walls 21 and 22, spirally extending vanes or deflector blades 73 are located, these blades being regularly spaced to form the spirally extending passageways 74 for receiving the dust-laden air entering through the louver passages 24 and imparting thereto a downward spiral movement into and through the inner shell 15. The pressure of the air entering the spiral passageways through the louver openings is such that the spiral formation or flow will continue almost to the bottom of the inner shell 15. The dust is heavier than the air, and centrifugal force draws it to the outer periphery of the spiral and this centrifugal force assisted by the force of gravity will carry the dust and deposit it in the bottom of the shell 15 below the end of the spiral movement, while the cleaned air forms a vortex or core and travels upwardly through the outer spiral path and escapes through the duct 25. The base or lower end of this vortex or core is closed to a discharge outlet 17 where a decided suction will be present and it is therefore necessary that the outlet 17 be kept closed to prevent escape of the dust with the vortex and out of the duct 25. By having the rotating discharge gate 68 in the outlet 17 the outlet will be kept closed so that the cyclonic operation will not be interfered with. The duct 25 extends a sufficient distance into the inner shell 15 to assist the vanes 73 in defining the outer dust collecting spiral flow A in the shell 15 and the inner core or vortex B. A suction device 75 may be applied to the duct 25 to assist in maintaining the vortex or core and drawing out the cleaned air.

With our improved machine coal or other materials may be rapidly and efficiently dedusted and the structure can be economically manufactured as it consists entirely of simple sheet metal parts. We have shown an efficient embodiment of the various features of the invention but do not desire to be limited to the exact construction, arrangement and operation shown and described as changes and modifications may be made without departing from the scope of the invention as defined in the appended claims.

We claim as our invention:

1. In apparatus of the class described, the combination of means defining a fixed annular path for the downward flow of material to be dedusted in the form of a shallow stream, means for blowing air under pressure through the falling material to take up dust therefrom, means defining a chamber within said stream and concentric therewith, said chamber at its upper end having inlets for the flow thereinto of the dust-laden air, an air outlet duct extending centrally through the upper part of said chamber, spiral vanes in the upper part of said chamber around said air outlet duct for imparting a whirling motion to the dust-laden air and causing such air to flow downwardly in said chamber in the form of a spiral for the separation of the dust from the air by gravity and centrifugal action and return of the cleaned air with the vortex of said spiral and through said air outlet duct, and a dust discharge outlet at the lower end of said chamber.

2. In apparatus of the class described, the combination of a cylindrical upper frame having an inlet at its upper end for material to be dedusted, screen structure in the upper part of said frame for receiving the material to be dedusted, said screen structure comprising screens inclining toward the sides of said frame, means for agitating said screens to facilitate the dropping of dust therethrough and downward flow thereon of the remaining material, means defining a chamber within said frame and below said screen, the upper walls of said chamber having louvers in the path of the dust falling through said screen and air inlets between said louvers, means for directing the material flowing down said screen to shower down between the walls of said frame and chamber, means for blowing air under pressure through the falling material and the dust from said screen, means for directing the dust-laden air through said air inlets into said chamber, and means within said chamber for creating a spiral whirl therein of the dust-laden air for the separation of the dust from the air.

3. In apparatus of the class described, the combination of an upper cylindrical frame having an inlet at its upper end for material to be dedusted, a screen structure in the upper part of said frame for receiving the material, said screen structure inclining downwardly toward the sides of said frame, means for agitating said screen structure to cause the dust to drop therethrough and the other material to flow downwardly thereon, walls within said frame defining a chamber below said screen structure having air inlets, a discharge shell depending from said frame, a discharge shell for dedusted material surrounding said other shell, means for guiding the material flowing down said screen structure to flow in a shallow stream into said outer discharge shell, air ports surrounding said stream and means for causing air flow under pressure through said ports and through the material in said stream and the dust dropped through said screen structure, the dust-laden air being received through said air inlets into said chamber, means within said chamber for imparting spiral movement to the dust laden air in said chamber and downward movement thereof in the form of a spiral in said inner shell for the separation of the dust from the air by centrifugal action, and discharge outlets for said shells for collected dust and dedusted material respectively.

4. In apparatus of the class described, the combination of a cylindrical upper frame having an inlet at its top for material to be dedusted, screen structure in the upper part of said frame for receiving the material, said screen structure inclining downwardly toward the sides of said frame, means for agitating said screen structure to facilitate the dropping of dust therethrough and downward flow thereon of the remaining material, walls within said frame defining a chamber below said screen structure provided with air inlets, an inner cylindrical discharge shell depending from said chamber, an outer discharge shell surrounding said inner shell and spaced away therefrom, walls between said chamber and frame walls for guiding into the space between said discharge shell the material flowing down from said screen structure, adjustable air ports through said guide walls and surrounding said material flowing past said walls, means for blowing air under pressure through said ports whereby the air will take up dust from the material and also the dust dropping through said screen structure, the dust-laden air flowing through said air inlets into said chamber, vanes within said chamber for imparting whirling movement to the dust-laden air in said chamber and for causing such air to flow downwardly in the inner discharge shell in the form of a spiral for separation of the dust from the air by centrifugal action, and means at the lower ends of said discharge shells for withdrawing respectively collected dust and dedusted material therefrom.

5. In apparatus of the class described, the combination of means for causing material to be dedusted to fall downwardly in a shallow annular stream through a fixed path, means for directing air under pressure to flow upwardly through the material to collect dust therefrom, means defining a chamber within said annular stream for receiving the dust laden air, a shell depending from said chamber and communicating therewith, stationary means within said chamber for imparting a whirling movement of the dust laden air and for causing said air to flow downwardly through said shell in the form of a spiral for the separation of the dust therefrom by centrifugal action, and a dust discharge outlet at the lower end of said shell.

6. In apparatus of the class described, the combination of means for causing material to be dedusted to fall downwardly in a shallow annular stream, means for directing air under pressure to flow upwardly through the stream for taking up dust therefrom, means for directing air under pressure to flow transversely through the upper part of the stream to collect dust therefrom, means defining a chamber within the upper part of said stream having inlet openings at its upper end through which the dust laden air may enter, stationary vanes within the upper part of said chamber for causing whirling movement of the dust laden air and downward travel thereof in the lower part of said chamber in the form of a spiral for the separation of the dust from the air by centrifugal action, and a dust discharge outlet at the lower end of said chamber.

7. In apparatus of the class described, the combination of outer and inner shells defining an annular passage for the downward flow of material to be dedusted, means for feeding material to said passage, means for causing air under pressure to flow upwardly through said passage and the material passing therethrough for collecting dust from the material, said inner shell at its upper end having inlet for the flow of the dust laden air into said inner shell, and means within said inner shell for causing separation of the air and the dust.

8. In apparatus of the class described, the combination of means defining an annular path for the downward flow of material to be dedusted, a conical, perforated feeder member above said path for feeding material thereto and removing part of the dust, a receiving chamber below said feeder member concentric therewith and with said path and having lateral air inlet passages, means directing air under pressure to flow upwardly through said annular path and the material falling therethrough to collect dust therefrom, means for directing air under pressure to flow transversely through the material as it flows through and from said feeder member for collection of dust therefrom, the dust laden air flowing into said chamber through said passages, means in said chamber imparting flow to the received air for separation of the dust therefrom by centrifugal force and gravity, and means for withdrawing the clean air from said chamber.

9. In apparatus of the class described, the combination of means defining a fixed annular path for the downward flow of material to be dedusted, a set of conical feeder plates concentric with and above said paths for distributing the material to the path, means for blowing air upwardly through the material falling through said path to collect dust therefrom, means forming a chamber within the upper end of said path and below said feeder plates, said chamber having lateral inlet for the dust laden air, means within said chamber for effecting separation of the dust from the air, and an air outlet conductor extending from said chamber.

10. In apparatus of the class described, the combination of means defining a fixed annular path for the downward flow of material to be dedusted, a conical feeder member above said annular path for distributing the material to be dedusted, guide means for guiding the material from said feeder member to said path, means defining a chamber between said path and said feeder member, said chamber having air inlets, means directing air under pressure to flow upwardly through the material falling through said path and through said inlets into said chamber, means for directing air under pressure to flow transversely through the material flowing from said feeder to said path and through said inlets into said chamber, means within said chamber for directioning the flowing dust laden air for separation of the dust therefrom by centrifugal force and gravity, and an outlet from said chamber for the dedusted air.

11. In apparatus of the class described, means defining an annular path for the downward flow of material to be dedusted, feeder means for distributing and feeding the material to said path, means defining a chamber within and concentric with said path, means directing air under pressure to flow upwardly through said annular path to collect dust from the material falling therethrough, inlets at the upper end of said chamber for the flow of the dust laden air into said chamber, stationary spiral vanes within the upper part of said chamber adjacent to said inlets for causing a spiral flow of the air downwardly in said chamber for separation of the dust from the air by centrifugal force and gravity, an outlet from the upper part of said chamber for the dedusted air, and a dust discharge outlet at the lower end of said chamber.

12. In coal dedusting apparatus, the combination of means defining a substantially vertical annular path, means for feeding the coal to be cleaned to the top of said path to fall downwardly therethrough, means defining a downward spiral path within said annular path, means causing flow of air under pressure upwardly through said annular path and then downwardly through said spiral path whereby the dust collected by the air during its flow through said annular path will be separated by centrifugal force and gravity from the air while flowing through said spiral path.

13. In coal dedusting apparatus, the combination of means defining an outer passage, and an inner passage surrounded by said outer passage, means for feeding coal to be cleaned to the top of the outer passage to fall downwardly therethrough, means causing flow of air under pressure upwardly through said outer passage for collection of dust from the coal and then into the top of said inner passage, and means within said inner passage for imparting a downwardly progressing cyclonic whirl to the dust laden air for the separation of the dust from the air by centrifugal force and gravity.

HENRY F. HEBLEY.
KLAAS PRINS.